No. 841,600. PATENTED JAN. 15, 1907.
G. STÜBGEN.
STORMPROOF LAMP.
APPLICATION FILED MAY 15, 1906.
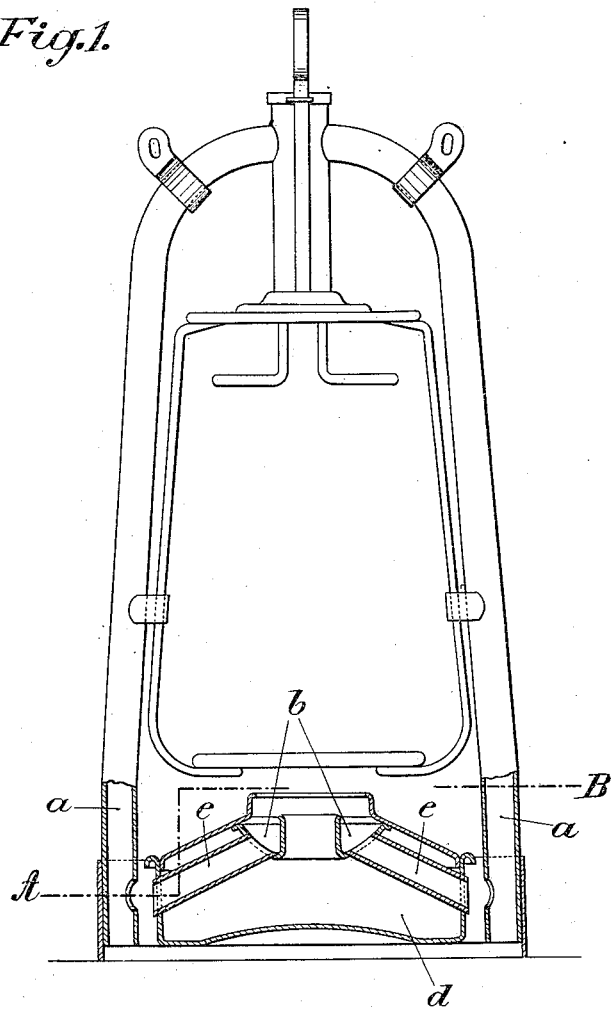
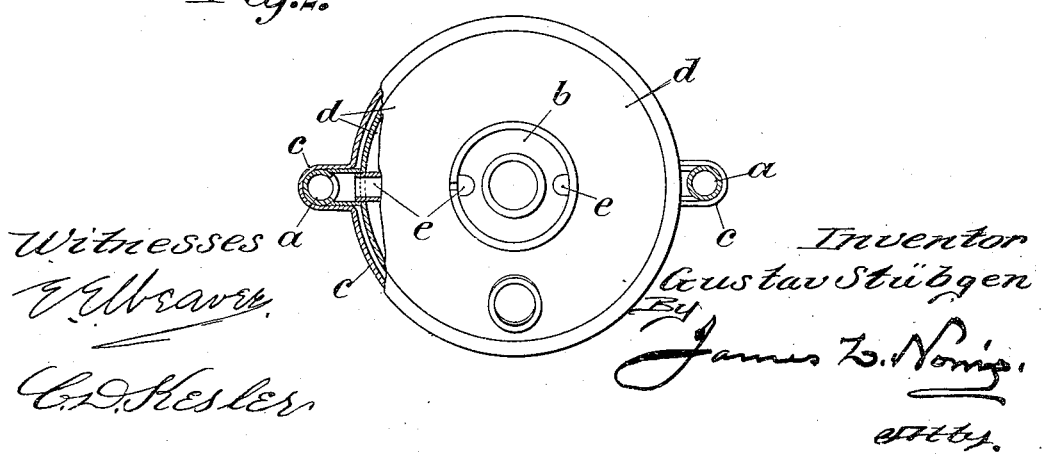

UNITED STATES PATENT OFFICE.

GUSTAV STÜBGEN, OF ERFURT, GERMANY.

STORMPROOF LAMP.

No. 841,600.     Specification of Letters Patent.     Patented Jan. 15, 1907.

Application filed May 15, 1906. Serial No. 316,988.

*To all whom it may concern:*

Be it known that I, GUSTAV STÜBGEN, manufacturer, a subject of the King of Prussia, residing at Erfurt, Kingdom of Prussia, German Empire, have invented certain new and useful Improvements in Stormproof Lamps, of which the following is a specification.

My invention relates to improvements in stormproof lamps.

The stormproof lamp according to this invention is characterized by the air-supply pipes being carried straight downward and provided at the bottom with a ring to which they are connected either directly or indirectly by means of intermediate parts. The tank is inserted in the ring and secured to it either permanently or in a detachable manner. The air-supply pipes for the tank or to the burners open into the said straight air-supply pipes, whereby the advantage is obtained that an increased air-supply is obtained at the regenerating-burner. The air-supply pipes can also be conveniently cleaned from soot, &c.

As is well known, the air-supply pipes have hitherto been carried to the tank in an arc, they could supply air to the burner only above the cylinder, and the air-supply pipes were formed in one with the tank, so that in use this connection of the pipes with the tank was often destroyed. This disadvantage is avoided in the construction according to this invention, for the air-supply pipes are connected to a separate ring supporting the tank, and the tank thus forms a separate part.

A construction of the lamp according to this invention is shown by way of example in the accompanying drawings, in which—

Figure 1 is a vertical section, and Fig. 2 is a cross-section on line A B.

The air-supply pipes $a$ are carried straight downward and are either open or provided with a detachable cover. The air-supply pipes $a$ are connected to the ring $c$ directly or indirectly. To the ring $c$ is detachably or permanently connected the petrol-tank $d$. The air-flues $e$ lead laterally from the air-chamber $b$ of the burner to the air-supply pipes $a$.

What I claim is—

In a lamp of the class specified, the combination of air-supply pipes leading straight downwardly to the bottom of the lamp and having lower vertically-straight extremities formed with openings at their inner portions, a ring coöperating with the lower straight extremities of the pipe, and a petrol-tank and burner provided with opposite downwardly-inclined air-flues leading from the burner and passing through the tank, the lower ends of the flues being exterior of the tank and located adjacent to the openings at the inner portions of the lower straight extremities of the air-supply pipes.

In testimony whereof I have hereunto set my hand in presence of two subscribing witnesses.

GUSTAV STÜBGEN.

Witnesses:
    ERNST EBERHARDT,
    OTTO HELLER.